US012601993B2

(12) United States Patent
Kedem et al.

(10) Patent No.: US 12,601,993 B2
(45) Date of Patent: Apr. 14, 2026

(54) SERVICING PRINT BLANKETS

(71) Applicant: Hewlett-Packard Development Company, L.P., Spring, TX (US)

(72) Inventors: Amir Kedem, Ness Ziona (IL); Eyal Rosenwein, Ness Ziona (IL); Rea Yakar, Ness Ziona (IL); Shimi Nakash, Ness Ziona (IL)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 43 days.

(21) Appl. No.: 18/701,178

(22) PCT Filed: Oct. 14, 2021

(86) PCT No.: PCT/US2021/055030
§ 371 (c)(1),
(2) Date: Apr. 12, 2024

(87) PCT Pub. No.: WO2023/063955
PCT Pub. Date: Apr. 20, 2023

(65) Prior Publication Data

US 2024/0419104 A1 Dec. 19, 2024

(51) Int. Cl.

| | |
|---|---|
| ***G03G 15/16*** | (2006.01) |
| ***B08B 1/16*** | (2024.01) |
| ***B08B 1/54*** | (2024.01) |
| *B08B 1/34* | (2024.01) |

(52) U.S. Cl.
CPC ........... *G03G 15/161* (2013.01); *B08B 1/165* (2024.01); *B08B 1/54* (2024.01); *B08B 1/34* (2024.01); *G03G 2215/1661* (2013.01)

(58) Field of Classification Search
CPC ......... G03G 15/161; G03G 2215/1661; G03G 15/10; B08B 1/165; B08B 1/54; B08B 1/34
See application file for complete search history.

(56) References Cited

U.S. PATENT DOCUMENTS

| | | | | |
|---|---|---|---|---|
| 4,899,198 | A | 2/1990 | Mahoney | |
| 5,010,819 | A | 4/1991 | Uribe et al. | |
| 5,937,254 | A | 8/1999 | Maher et al. | |
| 11,320,766 | B2 * | 5/2022 | Kedem | G03G 15/11 |

(Continued)

FOREIGN PATENT DOCUMENTS

| | | | |
|---|---|---|---|
| CN | 211195436 | U | 8/2020 |
| DE | 102016102906 | * | 8/2017 |

(Continued)

*Primary Examiner* — Alexander Markoff
(74) *Attorney, Agent, or Firm* — Jordan IP Law, LLC

(57) ABSTRACT

In an example of the disclosure, a system to service a print blanket includes a rotatably mounted endless cleaning surface ("ECS"), a doctor blade, a heating element, and a container. The ECS is to carry a polymeric material and positioned to engage the print blanket. The doctor blade is disposed in relationship to the ECS and to a container to scrape a portion of the polymeric material from the ECS into the container. The heating element is to heat the container. The container is positioned to collect the scraped portion of polymeric material, and make heated polymeric material available to be picked up by the ECS as the ECS is rotated adjacent to the container.

15 Claims, 11 Drawing Sheets

(56) References Cited

U.S. PATENT DOCUMENTS

| | | | | |
|---|---|---|---|---|
| 11,573,507 | B2 * | 2/2023 | Kedem | G03G 15/11 |
| 2004/0234309 | A1 * | 11/2004 | Nagata | G03G 15/161<br>399/348 |
| 2007/0012210 | A1 * | 1/2007 | Lundin | B41F 35/00<br>101/425 |
| 2012/0087702 | A1 * | 4/2012 | McNamee | G03G 15/2025<br>399/327 |
| 2013/0045022 | A1 * | 2/2013 | Zhang | G03G 15/161<br>399/101 |
| 2014/0013980 | A1 * | 1/2014 | Veres | G03G 15/226<br>101/465 |
| 2018/0024492 | A1 * | 1/2018 | Borenstain | G03G 21/0076<br>399/350 |
| 2021/0232069 | A1 * | 7/2021 | Kedem | B08B 1/34 |
| 2021/0294245 | A1 * | 9/2021 | Kedem | G03G 15/162 |
| 2022/0227124 | A1 * | 7/2022 | Biegelsen | G03G 15/10 |
| 2024/0419104 | A1 * | 12/2024 | Kedem | B08B 1/54 |

FOREIGN PATENT DOCUMENTS

| | | | |
|---|---|---|---|
| DE | 102016102906 | A1 | 8/2017 |
| WO | 2019/182588 | A1 | 9/2019 |
| WO | 2020/027803 | A1 | 2/2020 |

* cited by examiner

SERVICING PRINT BLANKETS

BACKGROUND

A printer may apply print agents to a paper or another substrate. One example of a printer is a Liquid Electro-Photographic ("LEP") printer, which may be used to print using fluid print agents such as an electrostatic printing fluids. Such electrostatic printing fluids may include electrostatically charged or chargeable polymeric particles (for example, resin or toner particles) dispersed or suspended in a carrier fluid.

DRAWINGS

DETAILED DESCRIPTION

Figure 1:
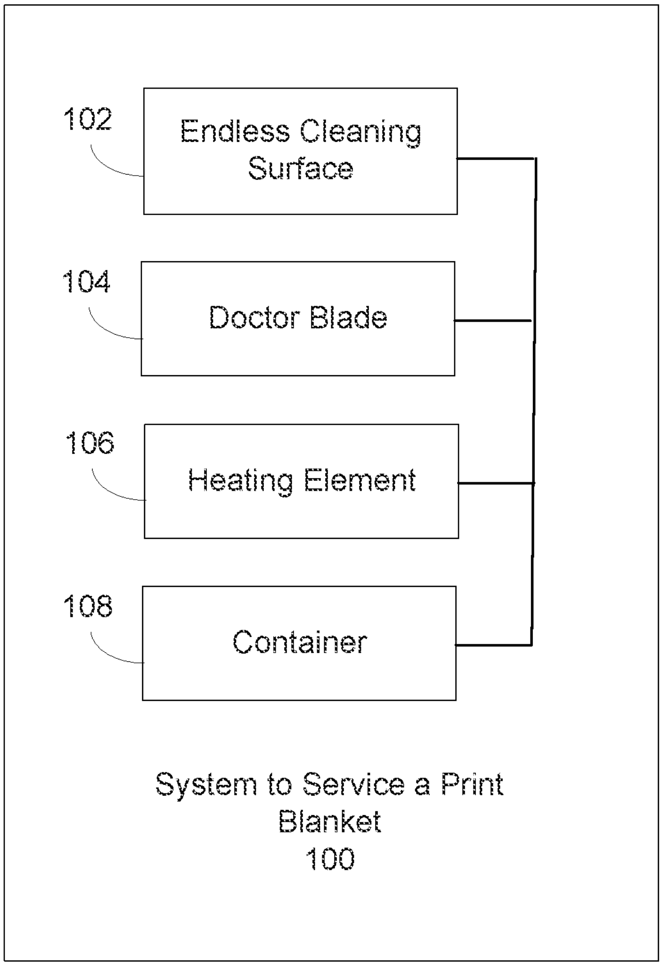
FIG. 1 is a block diagram depicting an example of a system to service a print blanket.

In an example of printing, a LEP printer may form an image on a print substrate by placing an electrostatic charge on a photoconductive surface, and then utilizing a laser scanning unit to apply an electrostatic pattern of the desired image on the photoconductive surface to selectively discharge the photoconductive surface. The selective discharging forms a latent electrostatic image on the photoconductive surface. The printer includes a developer assembly to develop the latent image into a visible image by applying a thin layer of polymeric electrostatic print fluid (which may be generally referred to as "LEP print agent", "LEP print fluid", "electronic print fluid", "LEP ink", or "electronic ink" in some examples) to the patterned photoconductive surface. Charged particles (sometimes referred to herein as "print fluid particles" or "colorant particles") in the LEP print fluid adhere to the electrostatic pattern on the photoconductive surface to form a print fluid image. In examples, the print fluid image, including colorant particles and carrier fluid, is transferred utilizing a combination of heat and pressure from the photoconductive surface to a print blanket attached to a rotatable print blanket drum or belt. The print blanket is heated until carrier fluid evaporates and colorant particles melt. A resulting molten film representative of the image is then applied to the surface of the print substrate via pressure and tackiness. In examples the print blanket that is attached to the print blanket drum or belt is a consumable or replaceable print blanket. For printing with colored print fluids, the printer may include a separate developer assembly for each of the various colored print fluids.

A significant challenge in LEP printing is that the print blanket is prone to contamination. After a number of transfers from the photoconductive surface to the print blanket, and subsequent transfers from the print blanket to a substrate, contaminants such as print agent residue, dust, machine oil and the like will build up on the surface of the print blanket. A roller or belt ECS coated with a thin, sticky layer of polymeric material (e.g., an LEP print agent or other thermoplastic print agent) can be brought into a cleaning contact with the print blanket to remove contaminants from the print blanket surface. However, with existing processes the sticky layer of the ECS can accumulate contaminants in an uneven manner during the cleaning contact with the print blanket, with the result that subsequent contacts with the print blanket yield in incomplete cleanings. The contaminants left on the print blanket due to the incomplete cleanings can significantly impact print quality.

To address these issues, various examples described in detail below provide a system and a method to service a print blanket. The disclosed examples enable establishing of a level layer of polymeric fluid on the ECS, such that when the endless surface contacts the print blanket the removal of contaminants is consistent across the print blanket surface. In examples, a system to service a print blanket includes a rotatably mounted ECS, a container, a heating element, and a doctor blade. The rotatably mounted ECS is to carry a polymeric material and is positioned to engage a print blanket. The doctor blade is disposed in relationship to the rotatably mounted ECS and to the container, and is to scrape a portion of polymeric material from the ECS into the container. The heating element is positioned to heat the container such that the polymeric material contained therein does not solidify. The container is positioned to collect the scraped portion of polymeric material from the ECS. The container is also positioned to make heated polymeric material available to be picked up by the ECS as the ECS is rotated adjacent to the container. In a particular example, the doctor blade is directly or indirectly attached to the container and a surface of the doctor blade is positioned to hold polymeric material within the container.

In certain examples, the system includes a containment blade disposed in relationship to the ECS to contain the scraped portion of polymeric material and liquified polymeric material in the container. In certain examples the container includes a removable collection element, with the removable collection element positioned such that such that excess polymeric material within the container can migrate into the collection element. In certain examples, the system includes a sensor, the sensor to provide data used in determining a full condition wherein the collection element holds more than predetermined quantity of polymeric material. In examples, upon such determination of a full condition the system may cause sending of an instruction to empty the collection element.

In certain examples, a print apparatus includes a print blanket, an ECS for cleaning the print blanket, and the system for cleaning the print blanket described herein. In examples, the print blanket is disposed upon a drum and is positioned to engage with a photoconductive surface. In other examples, the print blanket is disposed upon a belt and is positioned to engage with multiple photoconductive surfaces positioned in line with respect to direction of rotation of the print blanket.

In this manner the disclosed apparatus and method enable cleaning of a rotatably mounted ECS by leveling the surface of the ECS after the cleaning roller accumulates print blanket residues. The disclosed system and method enable frequent, or even continuous, cleaning of the ECS with minimal consumables usage and without interruption to the printing process or costumer workflow. The ability to effectively service an ECS in this manner enables use of the ECS to evacuate large amounts of print agent and substrate residues from a print blanket. Users and providers of LEP printers and other printers will appreciate the longer consumable print blanket life and improvements in print quality afforded by utilization of the disclosed examples. Installations and utilization of LEP printers that include the disclosed apparatus and methods should thereby be enhanced.

FIG. 1 is a block diagram depicting an example of a system to service a print blanket. In this example, system 100 includes an ECS 102, a doctor blade 104, a heating element 106, and a container 108. As used herein an "endless" surface refers generally to a surface positioned to form a circle, oval, or a loop. Examples endless surfaces include a convex curved surface (as opposed to the circular end surfaces) of a drum or canister. Other examples of endless surfaces include a strip of material, a belt, or a tape that has its ends joined together so as to form a loop. As used herein an "endless surface" includes a surface that is positioned to form a circle, oval or loop with no seam, or stitch, or other joining element. As used herein an "endless surface" also includes a surface that is positioned to form a circle, oval or loop, and includes a seam, stitch, or other joining element.

In examples, the ECS 102 may be a metal or plastic ECS that is affixed to, adhered to, or an exterior part of, a rotatable drum. In other examples, the ECS may be a metal or plastic ECS that is affixed to, adhered to, or part of, a rotatable belt.

Continuing with the example of FIG. 1, the ECS is to hold, support, bear, or carry a polymeric material. As used herein, a "polymeric material" refers generally to a material that has a molecular structure consisting chiefly or entirely of a large number of similar units bonded together. Examples of polymeric materials are resins and plastic, including thermoplastics. As used herein a "thermoplastic" refers generally to a plastic polymer that becomes pliable or moldable above a specific temperature and solidifies upon cooling. Polyethylene, polypropylene, polyvinyl chloride, polystyrene, polybenzimidazole, polyethyleneterephthalate, acrylic, and nylon are examples of thermoplastics. A "thermoplastic print agent" refers generally to a print agent that includes a thermoplastic material. As used herein, the term "print agent" refers generally to any material to any substance that can be applied upon a substrate by a printer during a printing operation, including but not limited to aqueous inks, solvent inks, UV-curable inks, dye sublimation inks, latex inks, liquid electro-photographic inks, liquid or solid toners, powders, primers, and overprint materials (such as a varnish). As used herein, a "print fluid" refers generally to any fluid that is to be applied to a substrate during a printing operation. As used herein, an "ink" refers generally to any fluid that is to be applied to a substrate to form an image upon the substrate during a printing operation.

The ECS 102 is positioned to rotate and to engage a print blanket while rotating. As used herein, a "print blanket" refers generally to an element that is to receive a print agent from a photoconductive surface and in turn transfer some or all of the received print agent to a substrate during a printing operation. A print blanket is also sometimes referred to as an "intermediate transfer member" or "ITM." As used herein a "photoconductive surface" refers generally to a surface of a material or a device that becomes more electrically conductive as it is exposed to electromagnetic radiation (e.g., visible light, ultraviolet light, infrared light, or gamma radiation).

Continuing with the example of FIG. 1, in an example, the print blanket may be, may be included in, or may be attached to a rotatably mounted drum and the photoconductive surface may be attached to, or a part of, another rotatably mounted drum, wherein the drums are arranged such that the print blanket and the photoconductive surface are each to rotate and abut one another throughout the rotations. In another example, the print blanket may be, may be included in, or may be attached to a rotatably mounted belt and the photoconductive surface may be attached to, or a part of, a rotatably mounted drum, wherein the belt and the drum are arranged such that the print blanket and the photoconductive surface are each to rotate and abut one another throughout the rotations.

The doctor blade 104 is a doctor blade disposed in relationship to the rotatably mounted ECS 102 and to the container 108 to scrape a portion of the polymeric material from the ECS 102 into the container 108. As used herein, a "doctor blade" represents generally any device with an edge is to be used to remove a material from a surface. In examples, doctor blade 104 may be or include, but is not limited to, any type of a blade (e.g., a straight blade, a curved blade, an angled blade, etc.), lathe, or gouge. In examples, the doctor blade 104 may include a blade of carbon steel, stainless steel, tool steel, alloy steel, cobalt alloy, titanium alloy, ceramic, obsidian, plastic, and/or any other durable material. In examples, the doctor blade 104 may be a fixed blade or may be a movable blade (e.g., a blade attached to a biasing element).

In a particular example, the doctor blade 104 may be blade or scraper with a convex surface. In some circumstances, a doctor blade with a convex surface will have enhanced rigidity relative to a flat doctor blade. In examples, a portion of the convex doctor blade 104 is to engage the ECS 102. In many circumstances utilizing a doctor blade with a small surface area relative to the ECS 102 will require less torque during the scraping and will better handle bumps of residue (with less doctor blade bounce) than a system that utilizes a large, fixed blade. As used herein, "residue" on an ECS 102 refers generally to a substance that remains at the ECS at a level that exceeds an intended threshold. In examples, the residue on the ECS may include print agent, paper dust, varnish, colorant, and/or resin that the ECS removed from the print blanket.

Continuing with the example of FIG. 1, the heating element 106 is positioned to heat the container 108 such that polymeric material (e.g., polymeric material caused to enter the container 108 as a result of the doctor blade 104 having scraped polymeric material from the ECS 102 into the container) held therein does not solidify. In certain examples, the heating element 106 may be a heating element that heats by conduction. In a particular example the heating element 106 is a conductive heating element that is operatively connected to a surface, e.g., a floor, of the container 108. In another example, the heating element 106 may be a convection heat source. In a particular example the heating element 106 may be a halogen lamp positioned adjacent to a surface, e.g., the floor, of the container 108 to heat the polymeric material held within the container 108 by convection.

The container 108 is positioned to collect the scraped portion of polymeric material, and is positioned to make heated polymeric material available to be picked up by the ECS 102 as the ECS is rotated adjacent to the container 108. As used herein, a "container" refers generally to any object or structure that can be used to hold or transport something. In examples, the container 108 may include floors, walls, and other structural surfaces made of plastics and/or metals. In certain examples, the doctor blade 104 is attached to the container 108 and a surface of the doctor blade 104 is positioned to hold or enclose polymeric material within the container 108.

Figure 2:
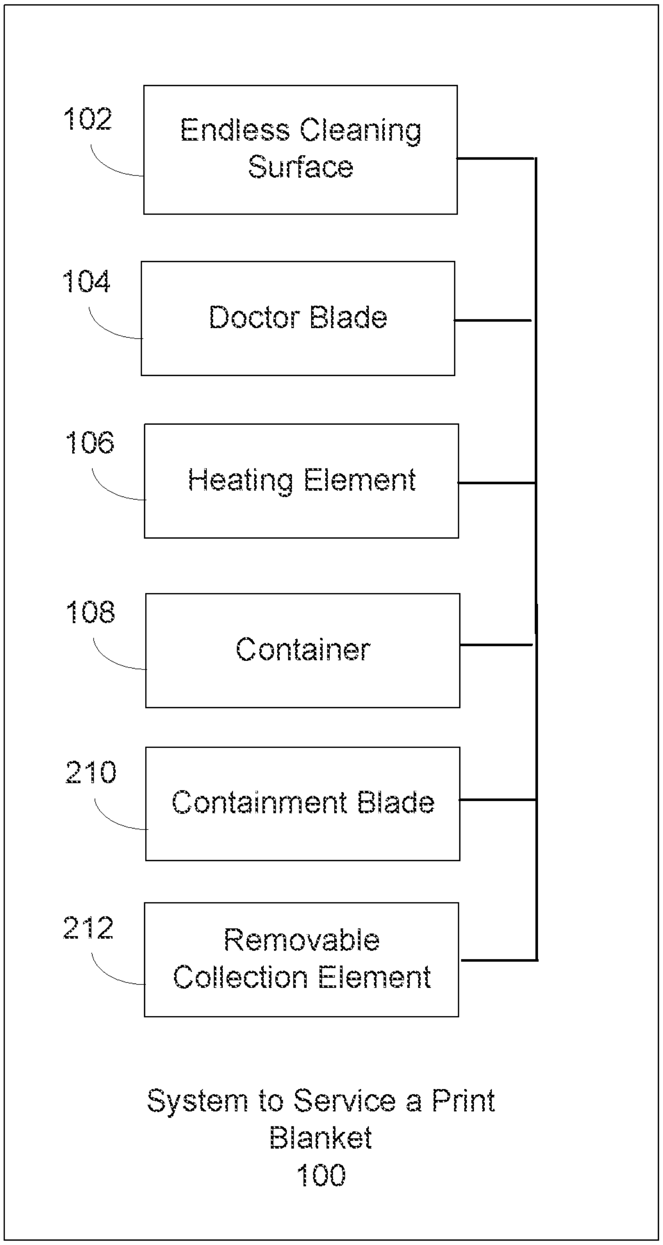
FIG. 2 is block diagram depicting another example of a system to service a print blanket, the system including a containment blade and a removable collection element.

FIG. 2 illustrates another example of system 100 for print blanket servicing. As in FIG. 1, system 100 includes a rotatably mounted ECS 102, a doctor blade 104, heating element 106, and a container 108. System 100 of FIG. 2 additionally includes a containment blade 210 and a removable collection element 212. As used herein a "containment blade" refers generally to a device, distinct from a doctor blade, that has a flexible edge that and is to assist with holding polymeric material in a container.

In examples, the containment blade 210 may be a fixed blade or a movable blade (e.g., a blade attached to a biasing element). In examples, the containment blade 210 may include a blade of carbon steel, stainless steel, tool steel, alloy steel, cobalt alloy, titanium alloy, ceramic, obsidian, plastic, and/or any other durable material. The containment blade 210 is disposed in relationship to the ECS 102 so as to assist with the containing of polymeric material in the container 108. In examples, the containment blade 210 has a flexible edge that is to be positioned with a predetermined gap between the containment blade and the ECS 102. The flexibility of the containment blade 210 is advantageous in that upon occasion the rotating ECS might inadvertently touch the containment blade 210 notwithstanding the gap. The damage to the ECS 102 and to the cleaning system 100 should be greatly reduced using a flexible containment blade 210, as compared to a situation where the ECS 102 inadvertently bumped into a solid, inflexible containment structure.

The polymeric material to be held and circulated within the container 108 includes polymeric material scraped from the ECS 102. Some of the contained polymeric material may be in liquid form as a result of heating of the container 108 by the heating element 106. Some of the contained polymeric material may be in solid or semi-solid form, e.g., polymeric material that was scraped from the ECS 102 by the doctor blade 104, where such polymeric material has not been in the container 108 for a sufficient time to be converted to liquid state. In a particular example, the containment blade 210 is attached to the container 108 and a surface of the containment blade 210 is positioned to hold polymeric material within the container 108.

Continuing with the example of FIG. 2, the container 108 includes a removable collection element 212. The collection element 212 may be positioned within, or adjacent to, the container 108 such that excess polymeric material within the container 108 will migrate from the body of the container into the collection element 212. In certain examples, the removable collection element 212 may be, or may include, a removable tray, or a tray with a removable mold.

In particular examples, the system 100 may include a sensor to monitor the level or amount of polymeric material held within a removable collection element 212. Based upon the measurement of the level or amount of polymeric material at the collection element 212, the system 100 may determine a "full" condition wherein the container holds more than a predetermined quantity of polymeric material, and upon such determination the system 100 sends an instruction to cause emptying of the collection element 212. In an example, the sending of the instruction may be to cause a display of a message, e.g., a visual message at a display monitor or an auditory message at a speaker, for a user to remove the collection element 212 to empty it of the contained polymeric material. In other examples, the instruction may be a digital signal or instruction sent to a component of system 100 to cause an automatic emptying of the collection element 212.

Figure 3:
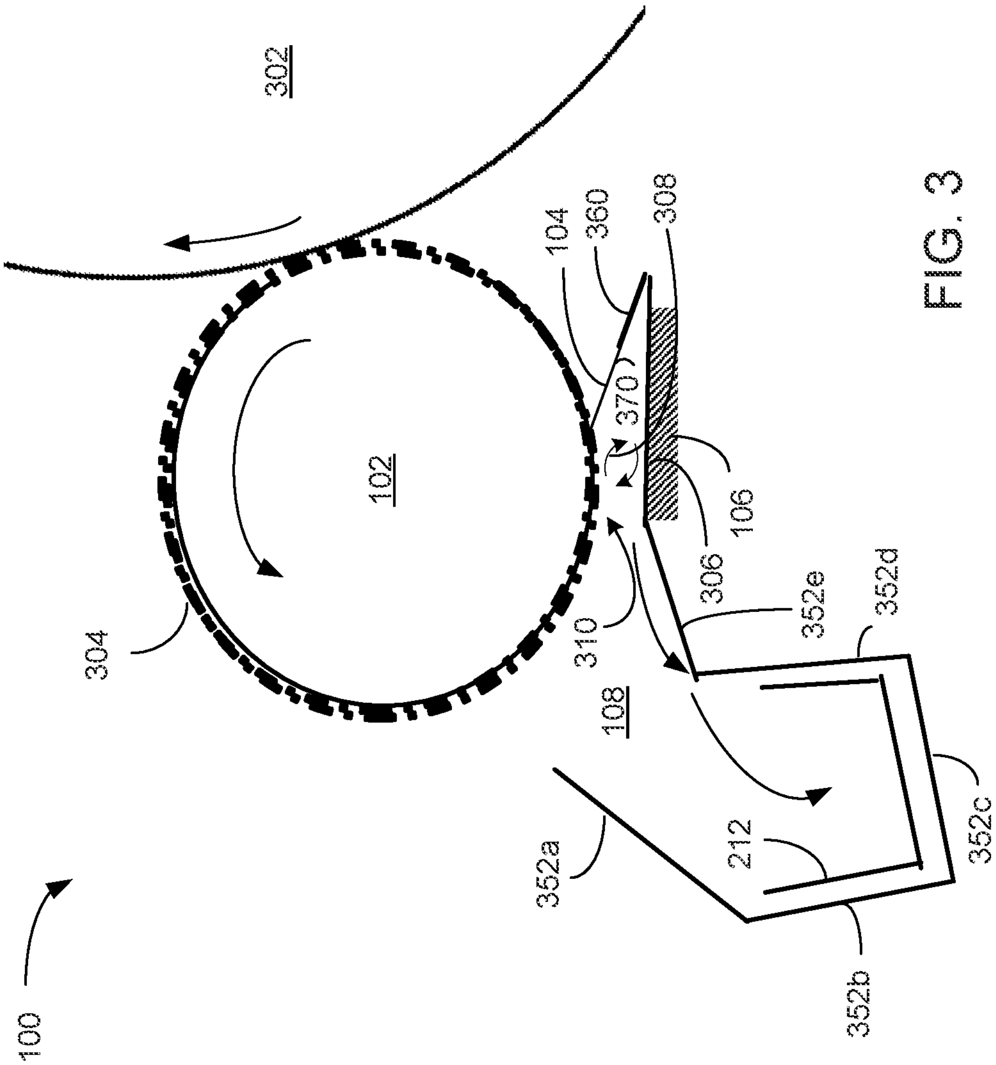
FIG. 3 is a simple schematic diagram that illustrates an example of a system to service a print blanket.

FIG. 3 is a simple schematic diagram that illustrates an example of a system to service a print blanket. The print blanket servicing system 100 includes an ECS 102, a doctor blade 104, a heating element 106, and a container 108. The print blanket 302 is disposed to rotate and to receive a polymeric material, e.g., a thermoplastic print agent, from a photoconductive surface during rotation. The ECS 102 is disposed to rotate and to engage the print blanket 302 and to receive a layer 304 of residue polymeric material from the print blanket 302.

The doctor blade 104 is positioned with respect to the ECS 102 and to the container 108 so as to scrape a portion of polymeric material from the ECS 102 into the container 108. The heating element 106 is a convection heating element positioned adjacent to an element 306, e.g., the floor, of the container 108 to heat the container by convection and thereby cause heating of the scraped-off polymeric material held within the container 108 to form a liquified polymeric material. In a particular example the heating element 106 may be a halogen lamp.

The container 108 is positioned to collect the portions of polymeric material print agent scraped from the layer 304 of residue polymeric material by the doctor blade 104. The container 108 is positioned to make the portions of liquified polymeric material 308 accessible to be picked up by the ECS 102 as the ECS 102 is rotated adjacent to an opening 310 of the container 108.

Continuing with the example of FIG. 3, the doctor blade 104 is attached to a containment wall 360 for the container 108, and a surface 370 of the doctor blade 104 is positioned to hold polymeric material 308 within the container 108. In examples, the doctor blade 104 may be attached to a doctor blade holder element that is a component of the containment wall 360. In examples, the doctor blade 104 is attached to the containment wall 360 via one or more of a clamp, bolt, screw, welding, or glue. In this example, the container 108 includes other containment walls **352*a*-352*e*. As the example of FIG. 3 is illustrated as a two-dimensional diagram, not all containment walls and/or surfaces of the container 108 are visible in FIG. 3**.

The system 100 includes a removable collection element 212. In this example, the collection element 212 is positioned within the container 108 such that excess polymeric material within the container 108 can migrate downward from upper portions of the container 108, e.g., portions adjacent to the opening 310, into the collection element 212. In examples, one or more of the containment walls **352*a*-352*d* may be movable such that the removable collection element 212** can be accessible to a user for emptying. In other examples, one or more of the containment walls

352*a*-352*d* may include a door to provide a user with access to the removable collection element 212.

Figure 4:
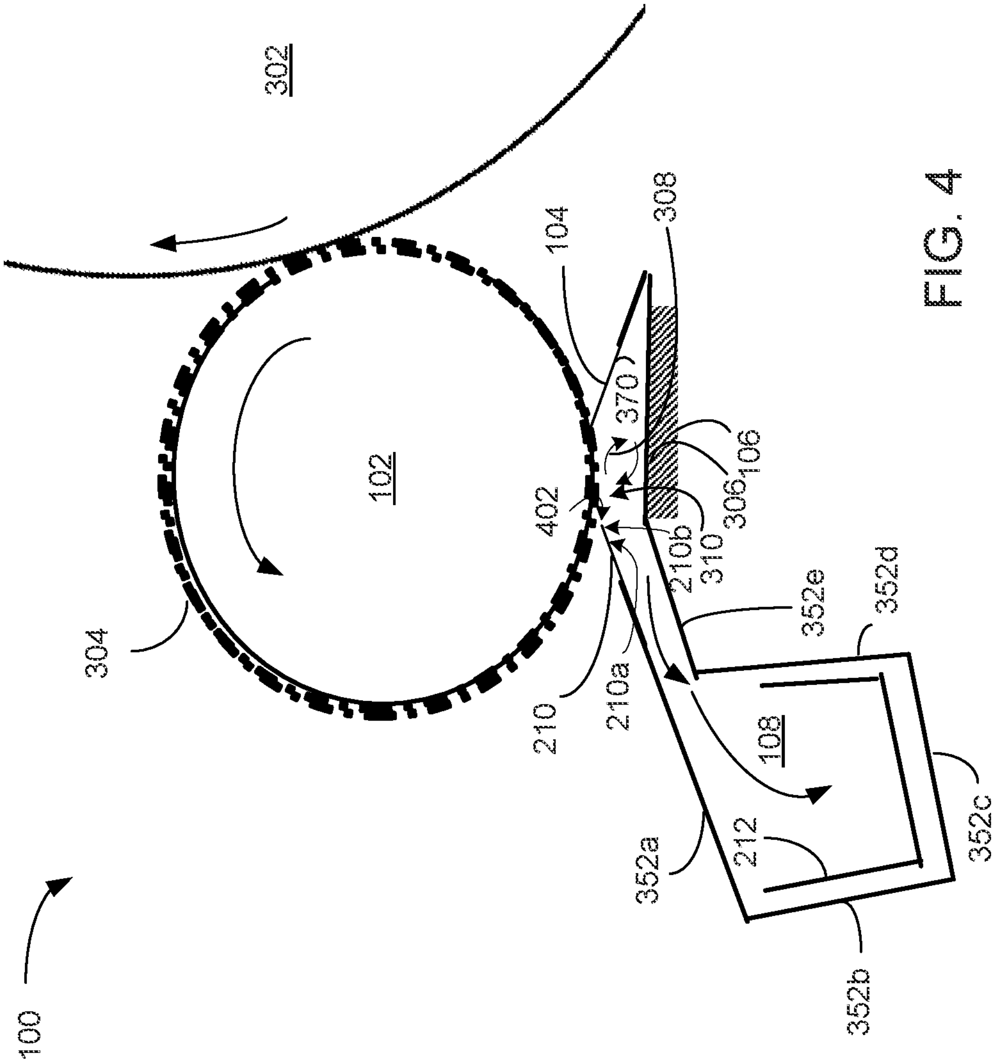
FIG. 4 is a simple schematic diagram that illustrates another example of a system to service a print blanket, the system including a containment blade.

FIG. 4 is a simple schematic diagram that illustrates another example of a system to service a print blanket. The example of a print blanket service system 100 illustrated at FIG. 4 is substantially similar to the system as described with respect to FIG. 3, except that in the example of FIG. 4 the system includes a flexible containment blade 210. As with the example of FIG. 3, the container 108 of FIG. 4 is positioned to collect a portion of polymeric material that is scraped from the layer 304 of residue polymeric material on the ECS 102 by the doctor blade 104. The containment blade 210 is to hold within the container 108 the scraped portion of polymeric material, and to hold liquified polymeric material. In examples, the liquified polymeric material is a product of the heating element 106 having caused heating of the container and the solid or semi-solid polymeric material previously scraped from the ECS 102 that is situated within the container. As with the example of FIG. 3, the container 108 of FIG. 4 is positioned to make heated polymeric material in a liquid state available to be picked up by the ECS 102 as the ECS 102 is rotated adjacent to the container 108. In examples wherein the polymeric material is a high viscosity polymeric material (e.g., a thermoplastic print agent), the containment blade 210 is to guide the scraped polymeric material away from the ECS 102, and to prevent cold and solid material from being pulled back to the ECS 102.

In this example, the containment blade 210 is attached to containment wall 352*a* of the container 108, and a first surface 210*a* of the containment blade 210 is positioned to hold scraped and liquid polymeric material within the container 108. In examples, the doctor blade 104 may be attached to a doctor blade holder element that is a component of the containment wall 360. In examples, the containment blade 210 may be attached to the containment wall 352*a* via one or more of a clamp, bolt, screw, welding, or glue.

Continuing with the example of FIG. 4, a gap 402 exists between the containment blade 210 leading edge 210*b* and the ECS 102. The gap 402 is of a width that is close enough such that the containment blade will be effective in containing the scraped and liquified polymeric material, and yet wide enough to avoid the leading edge 210*b* colliding with and/or displacing polymeric material deposited on the ECS 102, or the ECS itself. In examples the gap may be between 0.25 mm and 2.00 mm. The gap 402, in combination with a flexible containment blade 210, is advantageous to avoid damage to the ECS 102 and to the cleaning system 100 that might otherwise by caused by the containment blade 210 leading edge 210*b* colliding with the polymeric material deposited on the ECS 102 to cause scattering of polymeric material outside the container 108, or by contact with the ECS 102.

Figure 5:
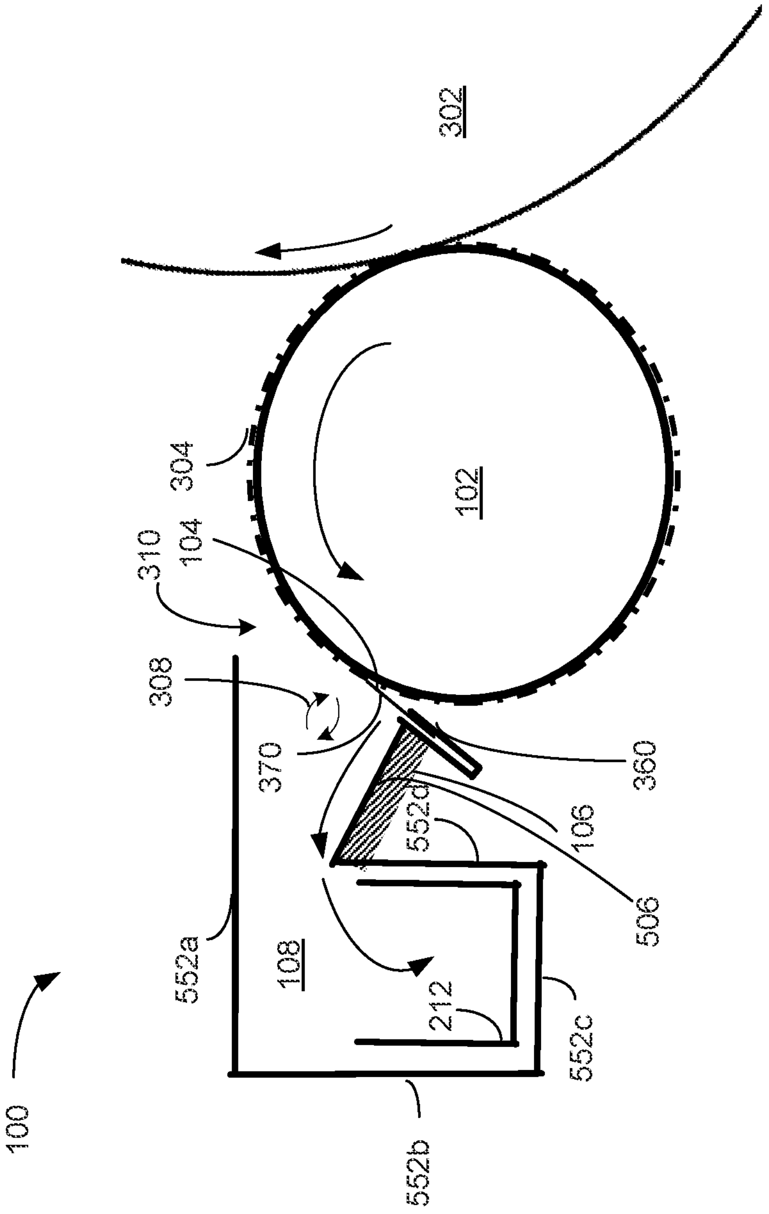
FIG. 5 is a simple schematic diagram that illustrates another example of a system to service a print blanket.

FIG. 5 is a simple schematic diagram that illustrates another example of a system to service a print blanket. The example of a print blanket service system 100 illustrated at FIG. 5 is substantially similar to the system as described with respect to FIG. 3, with exceptions noted in this paragraph. In the example of FIG. 5 the container 108 has containment walls 552*a*-552*d*. Returning to FIG. 3, in that example a floor structure 506 of the container is situated substantially horizontally beneath the ECS 102 such that scraped polymeric material can fall directly onto the floor structure 506. In the present example of FIG. 5, however, the floor structure 506 of the container 108 is situated at approximately a forty-five-degree angle and a similar height and alongside the ECS 102. In the example of FIG. 5, notwithstanding that the floor structure 506 is not beneath the ECS 102, the container 108 is positioned to receive polymeric material scraped from the ECS 102 by the doctor blade 104. Further, in the example of FIG. 5 notwithstanding that the floor structure 506 is not beneath the ECS 102, the container 108 is positioned to make heated polymeric material, in a liquified form, accessible to be picked up by the ECS 102 as the ECS 102 is rotated adjacent to an opening 310 of the container 108.

Figure 6:
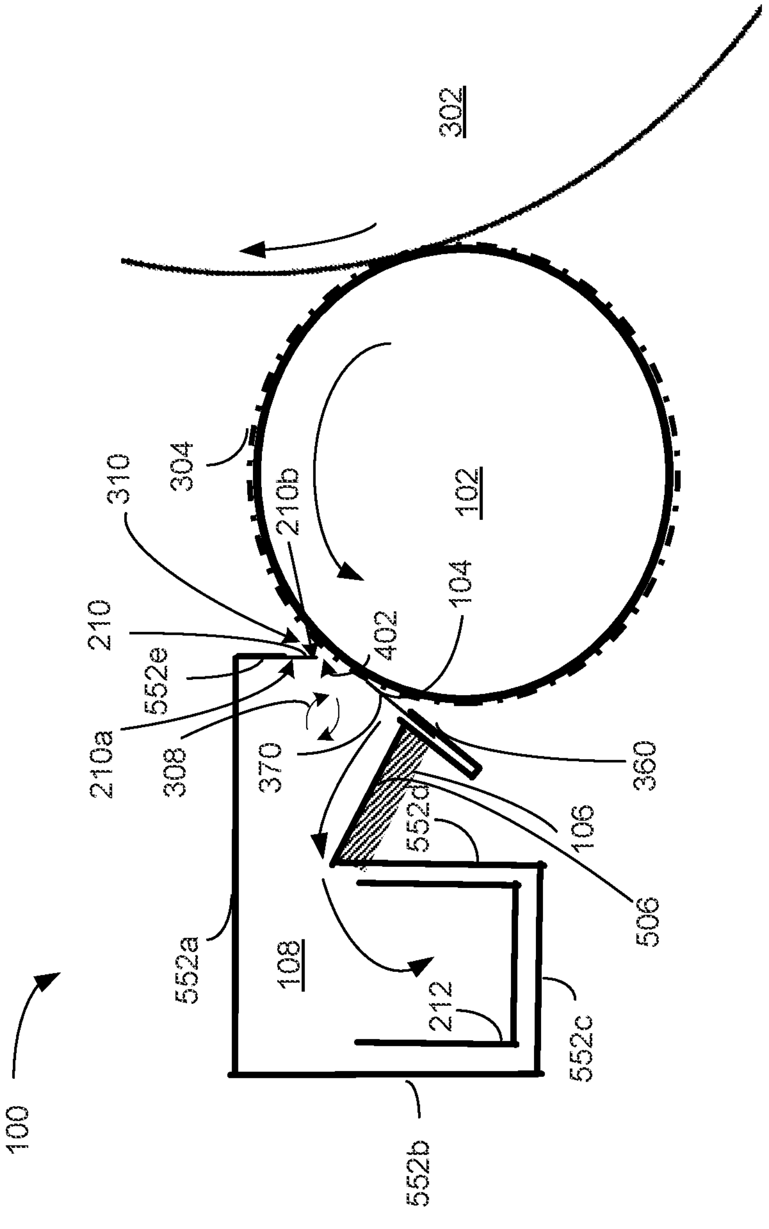
FIG. 6 is a simple schematic diagram that illustrates another example of a system to service a print blanket, the system including a containment blade.

FIG. 6 is a simple schematic diagram that illustrates another example of a system to service a print blanket. The example of a print blanket service system 100 illustrated at FIG. 6 is substantially similar to the system as described with respect to FIG. 5, except that in the example of FIG. 6 the system includes a flexible containment blade 210. As with the example of FIG. 5, the floor structure 506 of the container 108 is situated at approximately a forty-five-degree angle and a similar height and alongside the ECS 102. The container 108 is positioned to collect a portion of polymeric material that is scraped from scraped from the layer 304 of residue polymeric material on the ECS 102 by the doctor blade 104.

In this example, the containment blade 210 is attached to a containment wall 552*e* of the container 108, and a first surface 210*a* of the containment blade 210 is positioned to hold within the container 108 solid or semi-solid polymeric material recently scaped by the doctor blade 104 into the container 108. The first surface 210*a* of the containment blade 210 is likewise positioned to hold within the container 108 polymeric material that was previously scraped from the ECS 102 by the doctor blade 104, and that was subsequently liquified as a result of heat applied to the floor portion 506 by the heating element 106. As with the example of FIG. 5, the container 108 of FIG. 6 is positioned to make heated polymeric material in a liquid state available to be picked up by the ECS 102 as the ECS 102 is rotated adjacent to the container 108.

A gap 402 exists between the containment blade 210 leading edge 210*b* and the ECS 102. The gap 402 is advantageous to avoid damage to the ECS 102 and to the cleaning system 100 that could occur if the containment blade 210 leading edge 210*b* were to contact the polymeric material deposited on the ECS 102. Such contact could cause a messy dispersion of polymeric material outside the container 108. Such contact, with sufficient force, could likewise cause damage to the ECS 102. As discussed with respect to FIG. 4, the risk of damaging the ECS 102 can be mitigated somewhat by utilizing a containment blade 210 that is capable of flexing or bending should there be an unintended contact between the containment blade 210 and the ECS 102.

Figure 7B:
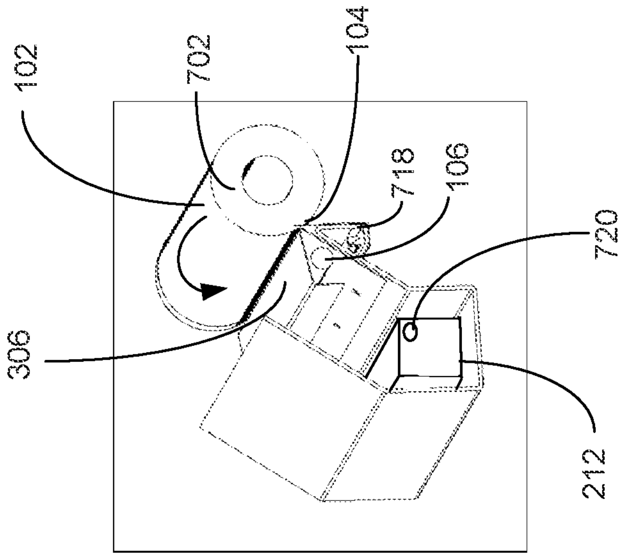
FIG. 7A is a simple schematic diagram and FIG. 7B is a perspective view diagram that illustrate another example of a system to service a print blanket.
Figure 7A:
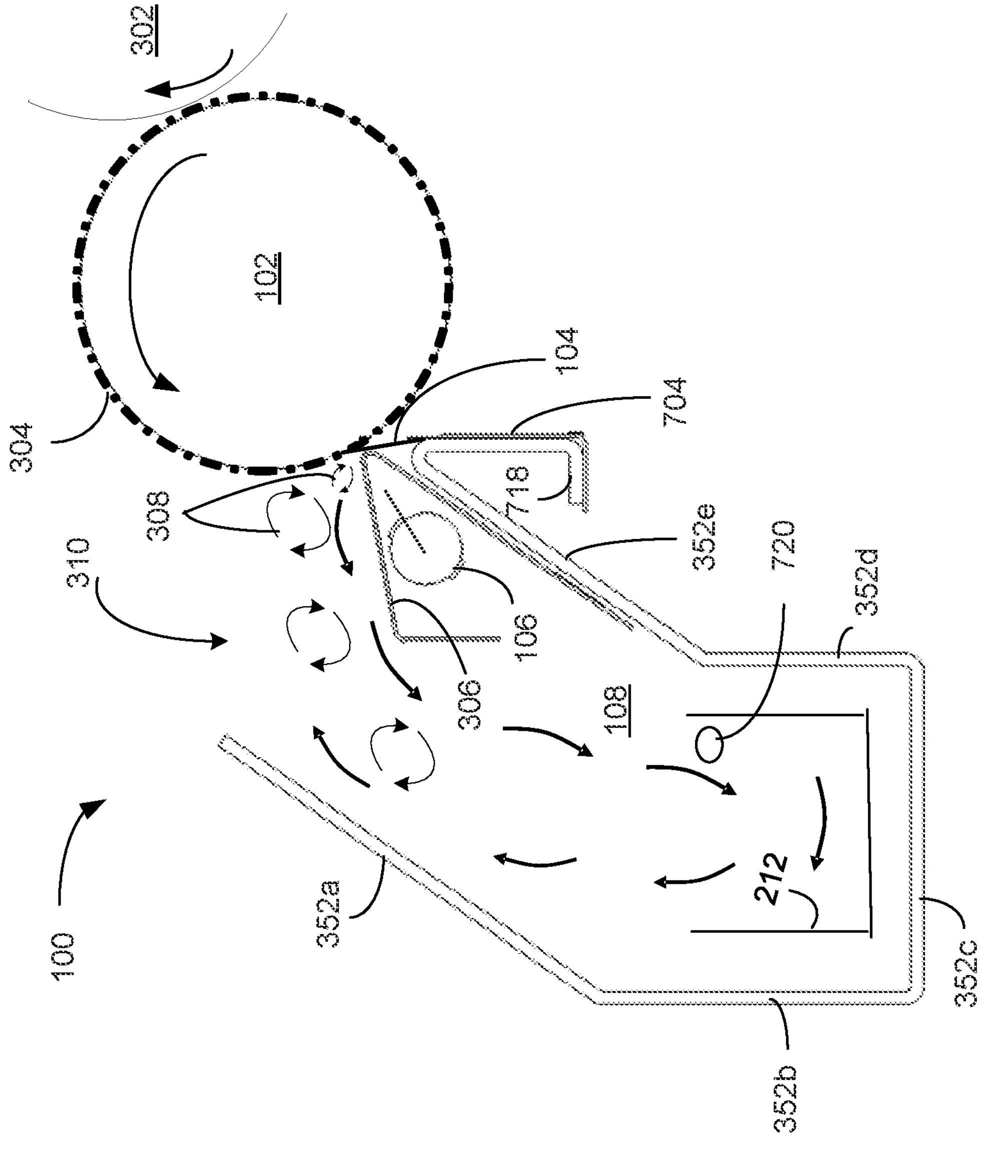

FIG. 7A is a simple schematic diagram and FIG. 7B is a perspective view diagram that illustrate another example of a system to service a print blanket. The print blanket servicing system 100 includes an ECS 102, a doctor blade 104, a heating element 106, and a container 108. The print blanket 302 is situated to be rotatable, e.g., is situated upon a drum or belt (not depicted in FIGS. 7A and 7B. The print blanket 302 is in a position to receive from a photoconductive surface, during contact as the print blanket 302 and the photoconductive surface are rotated in opposition to one another, a layer of polymeric material, e.g., a thermoplastic print agent. In examples the layer of polymeric material received at the print blanket 302 is a one separation of multiple separations in a printing process that are to be successively applied by the print blanket to a substrate to form a printed image.

In this example the ECS 102 is wrapped around a drum 702. The drum 702 is to revolve and cause the ECS 102 to engage the revolving print blanket 302. As a result of this engagement, the ECS 102 is to receive a layer 304 of residue polymeric material from the print blanket 302. In an example the polymeric material on the blanket 302 is residue that remains after the print blanket 302 had deposited print agent upon a substrate to form an image separation on the substrate. The ECS 102 is to remove excess residue from print blanket 302 via a rotating contact with the print blanket 302.

A doctor blade 104 is situated at a position wherein the doctor blade can scrape a portion of polymeric material from the ECS 102 into the container 108. In this example the heating element 106 is a convection heater situated adjacent to a floor structure 306 of the container 108 to heat the container and thereby heat the polymeric material held in the container 108.

Continuing at FIGS. 7A and 7B, the system 100 includes a biasing device 718. The biasing device 718 is to bias the doctor blade 104 towards the ECS 102 to cause the doctor blade 104 to scrape the ECS with a pressure that is to remove of a portion of the polymeric material while leaving an operative layer of polymeric material on the ECS. As used herein an "operative layer" of polymeric material upon an ECS refers generally to a layer of polymeric material that has a predetermined thickness and that is to be utilized by an ECS to remove residue from a print blanket as the ECS and the print blanket are rotated in contact with one another. In examples, the biasing device 718 may be, or may include, a spring, such that doctor blade 104 is spring-loaded to bias towards ECS 102 and thereby cause the doctor blade 104 to scrape the ECS 102. In examples, the biasing device 718 may be a compression spring. In other examples, the biasing device may be a tension spring any other type of spring or any other device that causes the doctor blade 104 to bias towards the ECS 102.

In examples, the amount of polymeric material to be scraped from the ECS 102 by the doctor blade 104 is a function of the attack angle and the applied force of the doctor blade relative to the ECS. In a particular example the doctor blade scraping is achieved by having a doctor blade 104 with an attack angle of between 15 and 45 degrees, a length of approximately 2 mm, a blade thickness of 0.2 mm, and a biased deflection of 3±1 mm. In this example the force applied by the biased doctor blade to the ECS 102 is between 6 N\mm and 2 N\mm. In this example, the operative layer of polymeric material to remain on the ECS after scraping by the doctor blade 104 is between 10 microns and 50 microns. In yet another example, the doctor blade may have a length of between 9 mm and 15 mm, with an attack angle between 15 and 45 degrees, and an applied force between 4 N\mm and 17 N\mm. In this example, the operative layer of polymeric material to remain on the ECS after scraping by the doctor blade 104 is between 10 microns and 50 microns.

The container 108 is positioned to collect the portions of polymeric material print agent scraped by the doctor blade 104 from the layer 304 of residue polymeric material on the ECS 102. The container 108 is positioned to make a liquified portion of the polymeric material 308 in the container 108 accessible to be picked up by the ECS 102 as the ECS 102 is rotated adjacent to an opening 310 of the container 108.

Continuing at FIGS. 7A and 7B, the system 100 includes a removable collection element 212. In this example, the collection element 212 is positioned within the container 108 such that excess polymeric material within the container 108 can migrate into the collection element 212. In examples, one or more of the containment walls 352*a*-352*d* may be movable, or include a door, such that the removable collection element 212 can be accessible to a user for emptying.

In the example of FIGS. 7A and 7*b*, the system 100 includes a sensor 720 to measure a level or amount of polymeric material held within the removable collection element 212. Based upon the measurement of the level or amount of polymeric material at the collection element 212, the system 100 may determine a "full" condition. Upon determination of the full condition, system 100 may send an instruction to cause emptying of the collection element 212. In examples the instruction may be an instruction for display to a user. In other examples, the instruction may be an instruction sent to a component of system 100, or another system, to cause automatic emptying of collection element 212.

Figure 8:
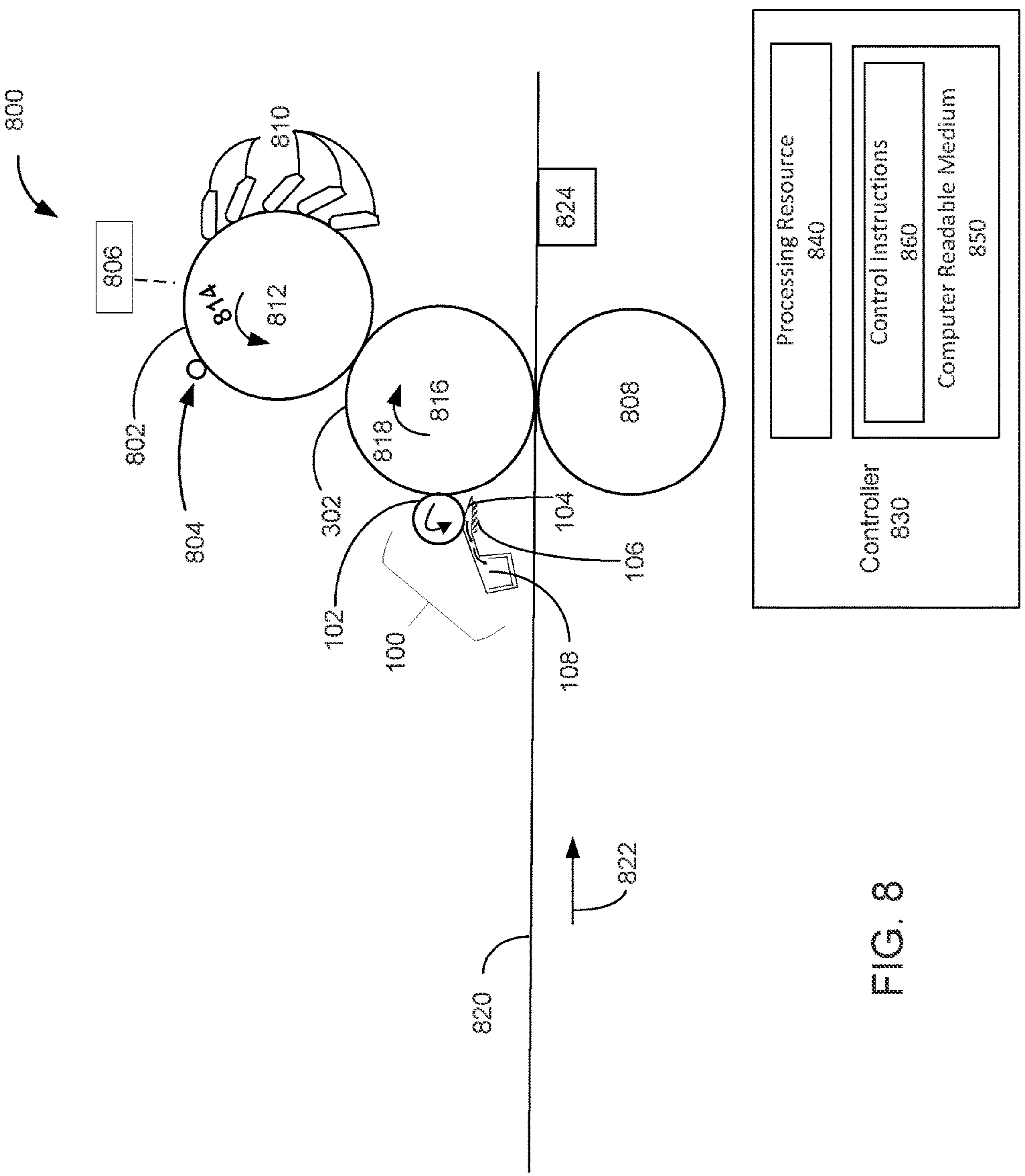
FIG. 8 is a simple schematic diagram illustrating an LEP printer implementing a system to service a print blanket, according to an example of the principles described herein.

FIG. 8 is a simple schematic diagram illustrating an LEP printer implementing a system to service a print blanket, according to another example of the principles described herein. In this example, a LEP printer 800 includes a photoconductive surface 802, a charging element 804, an imaging assembly 806, a print blanket 302, an impression cylinder 808, a set of five developer assemblies 810, and a system 100 to service the print blanket.

According to the example of FIG. 8, a pattern of electrostatic charge is formed on the photoconductive surface 802 by rotating a clean, bare segment of the photoconductive surface 802 under a charging element 804. The photoconductive surface 802 in this example is cylindrical in shape, e.g., is attached to a first cylindrical drum 812, and rotates in a direction of arrow 814. In other examples, a photoconductive surface may planar or part of a belt-driven system.

The charging element 804 may include a charging device, such as a charge roller, corona wire, scorotron, or any other charging device. A uniform static charge is deposited on the photoconductive surface 802 by the charging element 804. As the photoconductive surface 802 continues to rotate, it passes an imaging assembly 806 where one or more laser beams dissipate localized charge in selected portions of the photoconductive surface 802 to leave an invisible electrostatic charge pattern ("latent image") that corresponds to the image to be printed. In some examples, the charging element 804 applies a negative charge to the surface of the photoconductive surface 802. In other implementations, the charge is a positive charge. The imaging assembly 806 then selectively discharges portions of the photoconductive surface 802, resulting in local neutralized regions on the photoconductive surface 802.

Continuing with the example of FIG. 8, a set of five developer assemblies 810 is disposed adjacent to the photoconductive surface 802 and may correspond to various print fluid colors such as cyan, magenta, yellow, black, a custom spot color, and the like. There may be one developer assembly 810 for each print fluid color. In other examples, e.g., black and white printing, a single developer assembly 810 may be included in LEP printer 800. During printing, the appropriate developer assembly 810 is engaged with the photoconductive surface 802. The engaged developer assembly 810 presents a uniform film of print fluid to the photoconductive surface 802. The print fluid contains electrically charged pigment particles which are attracted to the opposing charges on the image areas of the photoconductive surface 802. As a result, the photoconductive surface 802 has a developed image on its surface, i.e., a pattern of print fluid corresponding with the electrostatic charge pattern (also sometimes referred to as a "separation").

The print fluid is transferred from the photoconductive surface 802 to print blanket 302. The print blanket 302 may be in the form of a print blanket attached to a rotatable second cylindrical drum 816. In other examples, the print blanket may be in the form of a belt or other transfer system. In this particular example, the photoconductive surface 802 and print blanket 302 are on drums 812 and 816, respectively, that rotate relative to one another, such that the color separations are transferred during the relative rotation. In the example of FIG. 8, the print blanket 302 rotates in the direction of arrow 818. The transfer of a developed image from the photoconductive surface 802 to the print blanket 302 may be known as the "first transfer", which takes place at a point of engagement between the photoconductive surface 802 and the print blanket 302.

Once the layer of print fluid has been transferred to the print blanket 302, it is next transferred to a print substrate 820. In this example, print substrate 820 is a web substrate moving along a substrate path in a substrate path direction 822. In other examples, the print substrate may a sheet substrate that travels along a substrate path. This transfer from the print blanket 302 to the print substrate 820 may be deemed the "second transfer", which takes place at a point of engagement between the print blanket 302 and the print substrate 820. The impression cylinder 808 can both mechanically compress the print substrate 820 into contact with the print blanket 302 and also help feed the print substrate 820. In examples, the print substrate 820 may be a conductive or a non-conductive print substrate, including, but not limited to, paper, cardboard, sheets of metal, metal-coated paper, or metal-coated cardboard. In examples, the print substrate 820 with a printed image may be moved to a position to be scanned by an inline color measurement device 824, such as a spectrometer or densitometer, to generate optical density and/or background level data.

Continuing with the example of FIG. 8, the LEP printer includes a system 100 for servicing print blankets utilizing thermoplastic print agent that is similar to the example system 100 of FIG. 3 in that it includes the rotatably mounted ECS 102, a doctor blade 104, a heating element 106, and a container 108. In other examples the system 100 may include a containment blade (e.g., a containment blade such as containment blade 210 FIGS. 2, 4, 6), and/or a liquid level sensor (e.g., a liquid level sensor such as sensor 720 of FIGS. 7A and 7B).

In this example the LEP printer 800 includes a controller 830 operatively connected to components of the LEP printer, including system 100. Controller 830 represents the processing and memory resources and the programming, electronic circuitry and components needed to control the operative elements of LEP printer 800. Controller 830 may include distinct control elements for individual printer components. In the example shown in FIG. 8, controller 830 includes a processing resource 840 and a computer readable medium 850 with control instructions 860 that represent programming to control the voltage level applied by a voltage source, e.g., a power supply, to the imaging assembly 806, the charging element 804, one or more of the developer assemblies 810, the print blanket 302, and any other components of a LEP printer 800.

In this example, the controller 830 is also to control the system 100 for servicing print blankets. In particular, the processing resource 840 on the controller 830 executing control instructions 860 is to control the operative the elements of LEP printer 800 to cause a transfer of a portion of residue thermoplastic print agent from the print blanket 302 to the ECS 102 as the print blanket and ECS are rotated, with contact, in opposition to one another.

The processing resource 840 on the controller 830 executing control instructions 860 to control the operative the elements of LEP printer 800, e.g., by controlling rotation of the ECS 302 to contact the doctor blade 104, is to cause a scraping of a portion of the thermoplastic print agent from the rotating ECS 102. The doctor blade 104 is positioned adjacent to the ECS 102 to cause the portion of thermoplastic print agent to move into the container 108.

Continuing with the example of FIG. 8, the processing resource 840 on the controller 830 executing control instructions 860 to control the operative the elements of LEP printer 800 (e.g., heating element 106) to cause heating of the container such that thermoplastic print agent therein does not solidify.

The processing resource 840 on the controller 830 executing control instructions 860 to control the operative the elements of LEP printer 800 (e.g., by controlling rotation of the ECS 302) tis to cause the heated thermoplastic print agent in the container 108 to be picked up by the ECS 102 as the ECS is rotated adjacent to opening (e.g., an opening such as opening 310 FIG. 3) of the container 108.

In certain examples, the processing resource 840 on the controller 830 executing control instructions 860 to is control the operative the elements of LEP printer 800 (e.g., by controlling rotation of the ECS 302) to cause the doctor blade 104 to scrape the ECS 102 concurrent with the ECS 102 rotating to clean the print blanket 302. In certain examples, the controller 830 is to cause the doctor blade 104 to scrape the ECS 102 concurrent with the print blanket 302 being utilized in a printing operation (e.g., the print blanket 302 rotating receiving a thermoplastic print agent from the photoconductive surface 802 or the print blanket 302 transferring thermoplastic print agent to the print substrate 820).

Figure 9:
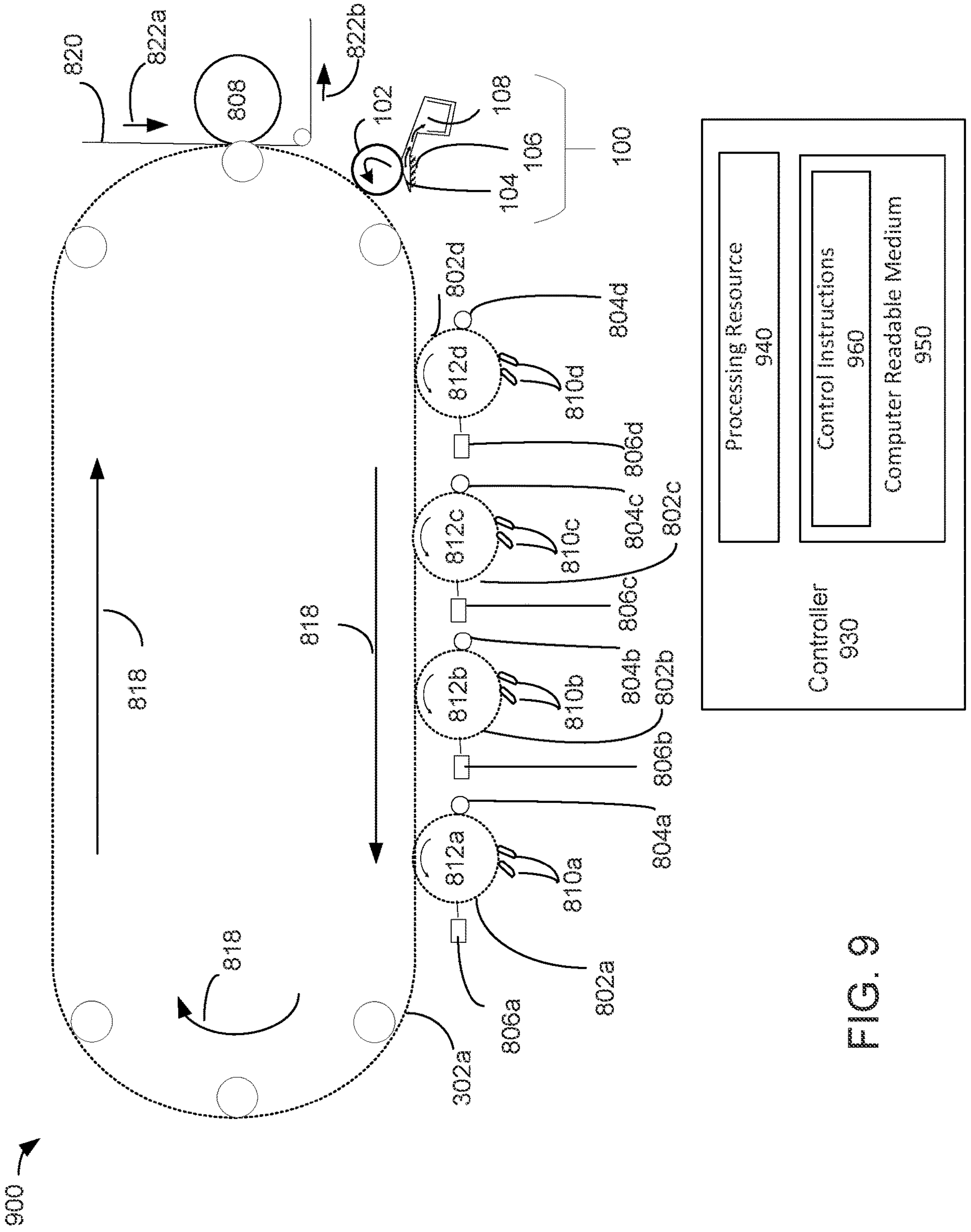
FIG. 9 is a simple schematic diagram illustrating an LEP printer implementing a system to service a print blanket, according to another example of the principles described herein.

FIG. 9 is a simple schematic diagram illustrating another example of a LEP printer implementing a system to service a print blanket. The example of a print blanket service system 100 illustrated at FIG. 9 is substantially similar to the system as described with respect to FIG. 8. In this example the print blanket 302*a* to be serviced is in the form of a belt, rather than being disposed upon a drum 816 as in FIG. 8. In examples, the print blanket may be in the form of an endless belt. In other examples, the print blanket may be otherwise disposed upon, or attached, to a belt.

In the example of FIG. 9 print blanket 302*a* is positioned to engage multiple photoconductive surfaces 802*a*-802*d*, rather than a single photoconductive surface 802 as presented in FIG. 8. In this example, each of the photoconductive surfaces 802*a*-802*d* is positioned to engage with a respective set of two developer assemblies 810*a*-810*d*, and has a dedicated imaging assembly 806*a*-806*d* and charging elements 804*a*-804*d*. In other examples, the sets of developer assemblies may be sets of one developer assembly or sets of more than two developer assemblies. In examples, each of the photoconductive surfaces 802*a*-802*d* may engage with a set of developer assemblies where not all of the sets have the same number of developer assembles.

Each instance of the combination of developer assembly, an imaging assembly, a photoconductive surface, and a charging element may be referred to as an "imaging engine." With this FIG. 9 example architecture having four inline imaging engines with photoconductive surfaces 802*a*-802*d* engaged with a single blanket belt 302*a*, the LEP printer 900 is capable of printing up to four separations, e.g., four colors, with a single revolution of the blanket belt 302*a* at a continuous process speed. In other examples, LEP printer 900 may have more or less inline imaging engines.

According to the example of FIG. 9, a pattern of electrostatic charge is formed on each of the photoconductive surfaces 802*a*-802*d* by rotating a clean, bare segment of the photoconductive surface under its respective charging element 804*a*-804*d*.

Continuing with the example of FIG. 9, during a single revolution of the print blanket 302*a* print fluid is successively transferred from each of the photoconductive surfaces 802*a*-802*d* to print blanket 302*a*. Separations, e.g., color separations, are transferred to the print blanket 302*a* during the relative rotations of the print blanket 302*a* and the photoconductive surfaces 802*a*-802*d*. In the example of FIG. 9, the print blanket belt 302*a* rotates in the direction of arrow 818. The transfer of a developed image from each of the photoconductive surfaces 802*a*-802*d* to the print blanket belt 302*a* are successive "first transfers", which takes place at a point of engagement between each of the photoconductive surfaces 802*a*-802*d* and the print blanket belt 302*a*.

Once the layers of print fluid have been transferred to the print blanket belt 302*a* (via a "first transfer" from each of the photoconductive surfaces 802*a*-802*d*), the layers are next transferred to a print substrate. In this example, print substrate 820 is a web substrate moving along a substrate path in a first substrate path direction 822*a*, and then in a second substrate path direction 822*b*. In other examples, the print substrate may a sheet substrate that travels along a substrate path. This transfer from the print blanket belt 302*a* to the print substrate 820 may be deemed the "second transfer", which takes place at a point of engagement between the print blanket belt 302*a* and the print substrate 820. The impression cylinder 808 can both mechanically compress the print substrate 820 into contact with the print blanket 302*a* and also help feed the print substrate 820.

In this example the LEP printer includes a system 100 for servicing print blankets utilizing thermoplastic print agent that is similar to the example system 100 of FIG. 3 in that it includes the rotatably mounted ECS 102, a doctor blade 104, a heating element 106, and a container 108. In other examples the system 100 may include a containment blade (e.g., a containment blade such as containment blade 210 FIGS. 2, 4, 6), and/or a liquid level sensor (e.g., a liquid level sensor such as sensor 720 of FIGS. 7A and 7B).

Continuing with the example of FIG. 9, controller 930 represents the processing and memory resources and the programming, electronic circuitry and components needed to control the operative elements of LEP printer 900. Controller 930 may include distinct control elements for individual printer components. In the example shown in FIG. 8, controller 930 includes a processing resource 940 and a computer readable medium 950 with control instructions 960 that represent programming to control the components of LEP printer 900. In this example, the controller 930 is also to control the system 100 for servicing print blankets. In this example, the system 100 for servicing a print blanket is positioned such that the ECS 102 is to rotatably engage with the rotating print blanket belt 302*a*. The system 100 for servicing a print blanket of is to operate as the system 100 described with respect to FIG. 8, with the exception that in FIG. 9 the print blanket to be engaged and serviced is a print blanket belt 302*a* rather than a print blanket 302 disposed upon a drum 816 as described in the example of FIG. 8.

Figure 10:
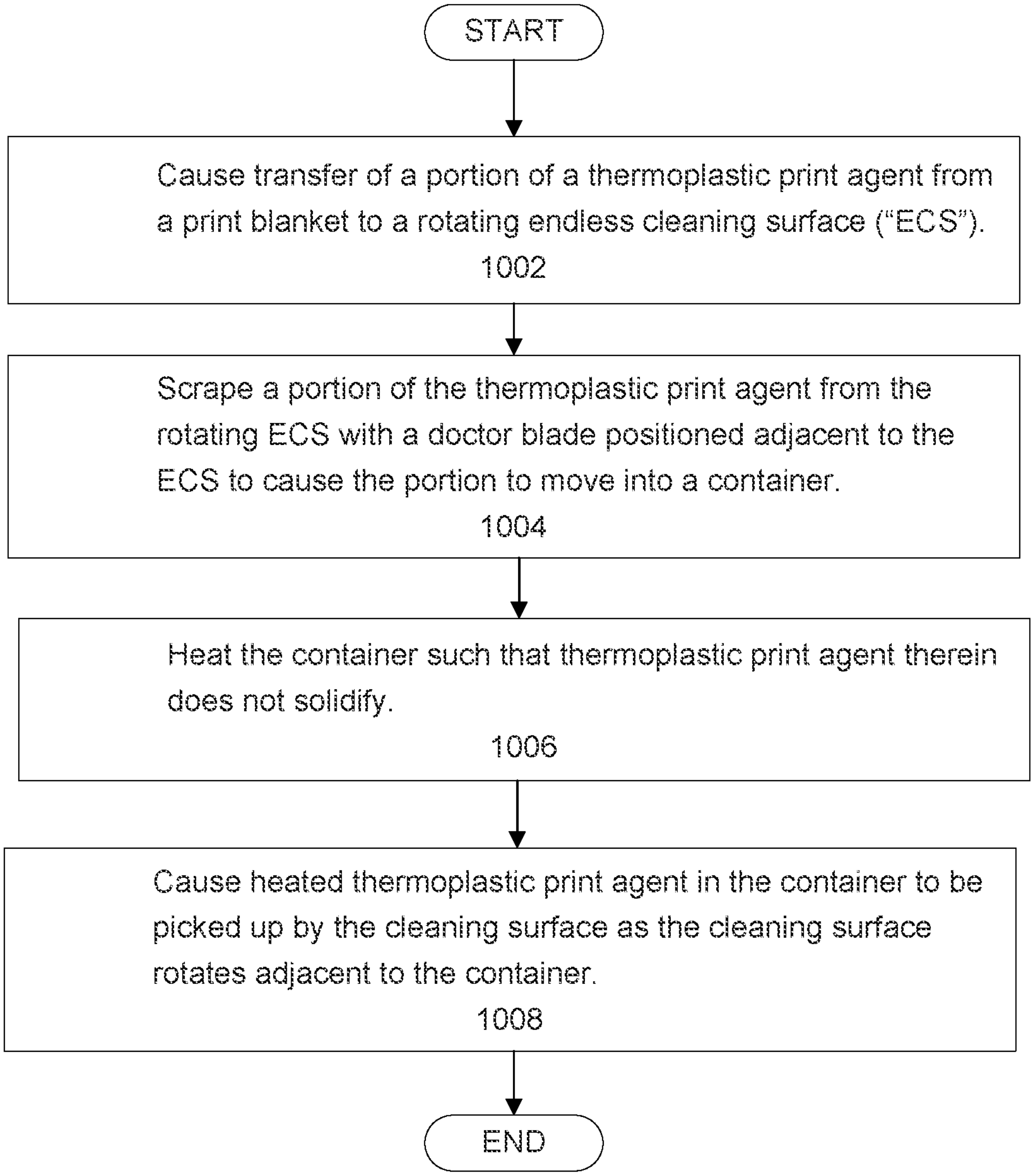
FIG. 10 is a flow diagram depicting an example implementation of a method for servicing a print blanket utilizing a thermoplastic print agent.

FIG. 10 is a flow diagram of implementation of a method for servicing a print blanket utilizing thermoplastic print agent. In discussing FIG. 10, reference may be made to the components depicted in FIGS. 8 and 9. Such reference is made to provide contextual examples and not to limit the manner in which the method depicted by FIG. 10 may be implemented. A transfer of a portion of a thermoplastic print agent from a print blanket to a rotating ECS is caused (block 1002). Referring back to FIGS. 8 and 9, control instructions 860, when executed by processing resource 840, or control instructions 960, when executed by processing resource 940, may be responsible for implementing block 1002.

A portion of the thermoplastic print agent is scraped from the rotating ECS with a doctor blade positioned adjacent to the ECS to cause the portion to move into a container (block 1004). Referring back to FIGS. 8 and 9, control instructions 860, when executed by processing resource 840, or control instructions 960, when executed by processing resource 940, may be responsible for implementing block 1004.

The container is heated such that thermoplastic print agent therein does not solidify (block 1006). Referring back to FIGS. 8 and 9, control instructions 860, when executed by processing resource 840, or control instructions 960, when executed by processing resource 940, may be responsible for implementing block 1006.

Heated thermoplastic print agent in the container is caused to be picked up by the ECS as the ECS rotates adjacent to the container (block 1008). Referring back to FIGS. 8 and 9, control instructions 860, when executed by processing resource 840, or control instructions 960, when executed by processing resource 940, may be responsible for implementing block 1008.

Figure 11:
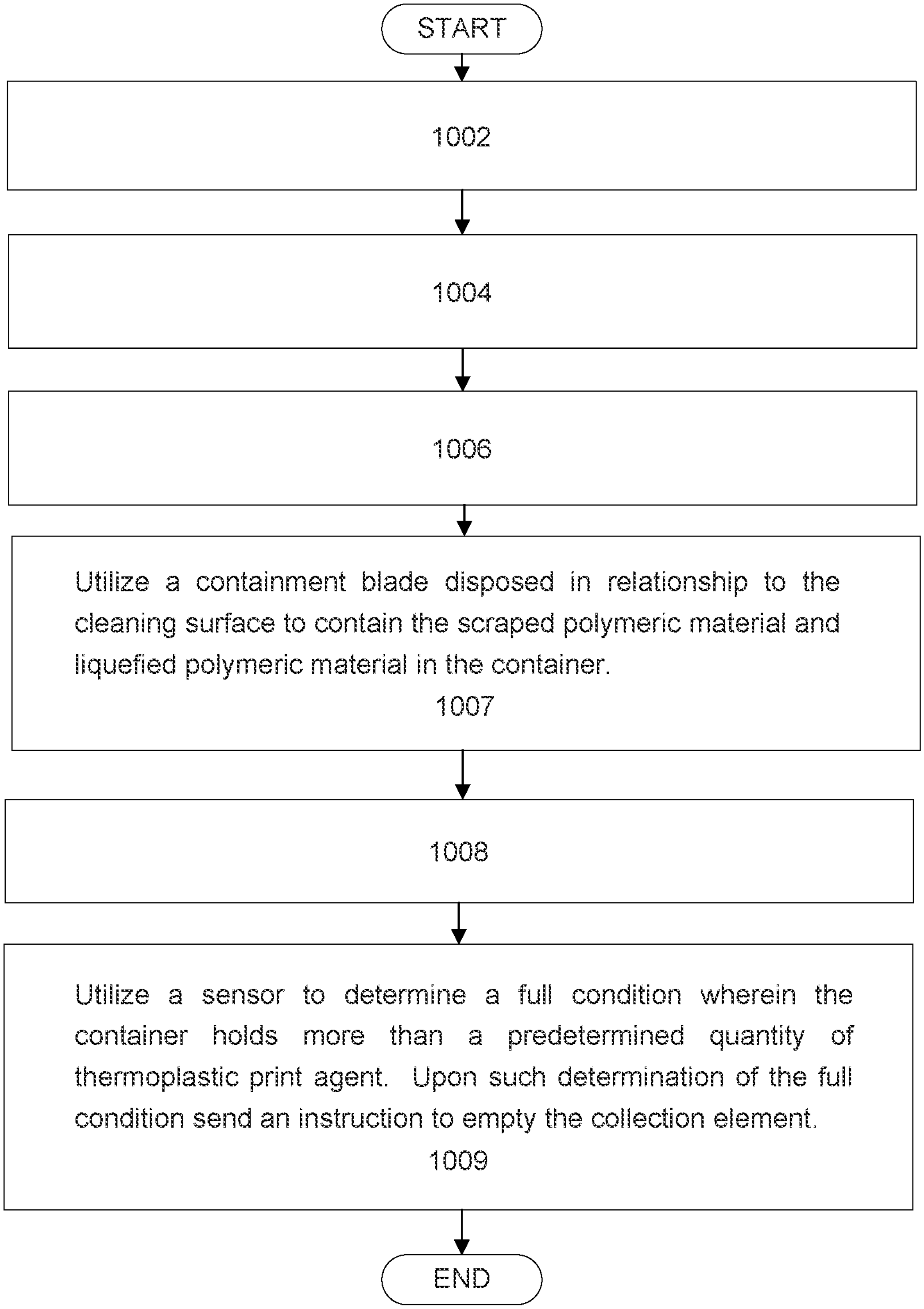
FIG. 11 is a flow diagram depicting another example implementation of a method for servicing a print blanket utilizing a thermoplastic print agent.

FIG. 11 is a flow diagram depicting another example implementation of a method for servicing a print blanket utilizing thermoplastic print agent. In discussing FIG. 11, reference may be made to the components depicted in FIGS. 8 and 9. Such reference is made to provide contextual examples and not to limit the manner in which the method depicted by FIG. 11 may be implemented.

The example of FIG. 11 is substantially the same as the example of FIG. 10. Specifically, the example of FIG. 11 includes each of blocks 1002, 1004, 1006, and 1008 of FIG. 10, and additional blocks 1007 and 1009 described below.

A containment blade disposed in relationship to the ECS is utilized to contain the scraped thermoplastic print agent and liquified thermoplastic print agent in the container (block 1007). Referring back to FIGS. 8 and 9, control instructions 860, when executed by processing resource 840, or control instructions 960, when executed by processing resource 940, may be responsible for implementing block 1007.

A sensor is utilized to determine a full condition wherein the container holds more than predetermined quantity of thermoplastic print agent. Upon such determination of the full condition an instruction to empty the collection element is sent (block 1009). Referring back to FIGS. 8 and 9, control instructions 860, when executed by processing resource 840, or control instructions 960, when executed by processing resource 940, may be responsible for implementing block 1009.

Although the flow diagrams of FIGS. 10 and 11 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

FIGS. 1-11 aid in depicting the architecture, functionality, and operation of various examples. In particular, FIGS. 1-9 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function (s). Examples can be realized in a memory resource for use by or in connection with a processing resource. A "processing resource" is an instruction execution system such as a computer/processor-based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A system to service a print blanket, comprising:

a rotatably mounted endless cleaning surface (ECS) to carry a polymeric material, wherein the ECS is positioned to engage the print blanket;

a doctor blade contacting the ECS and connected to a container to scrape polymeric material from the ECS into the container;

a heating element positioned to heat the container and polymeric material scraped from the ECS;

the container, positioned to collect polymeric material and make the polymeric material that is heated available to be picked up by the ECS.

2. The print blanket cleaning system of claim 1, wherein the doctor blade is positioned to hold polymeric material within the container.

3. The print blanket cleaning system of claim 1, wherein the container comprises a floor structure situated beneath the ECS.

4. The print blanket cleaning system of claim 1, comprising a biasing device to cause the doctor blade to scrape the ECS with a pressure that is to remove a portion of polymeric material while leaving a layer of polymeric material on the ECS.

5. The print blanket cleaning system of claim 1, further comprising a containment blade connected to the ECS to hold heated polymeric material in the container.

6. The print blanket cleaning system of claim 5, wherein the containment blade is positioned to hold polymeric material within the container.

7. The print blanket cleaning system of claim 1, wherein a gap exists between the containment blade and the ECS.

8. The print blanket cleaning system of claim 7 wherein the gap is between 0.25 mm and 2.00 mm.

9. The print blanket cleaning system of claim 1, comprising a removable collection element, with the removable collection element positioned such that polymeric material within the container can migrate into the removable collection element.

10. A print apparatus comprising:

a rotatable print blanket to receive thermoplastic print agent from a photoconductive surface;

an endless cleaning surface (ECS), disposed to rotate and to engage the print blanket, and to receive a layer of residue thermoplastic print agent from the print blanket;

a doctor blade connected to the ECS and to a container to scrape a portion of the thermoplastic print agent from the ECS into the container; and a heating element situated to heat the container and the portion of the thermoplastic print agent scraped into the container; and the container positioned to collect the portion of thermoplastic print agent scraped by the doctor blade, and positioned to make the portion of the thermoplastic print agent heated in the container accessible to be picked up by the ECS.

11. The print apparatus of claim 10, wherein the print blanket is on a drum, and wherein the photoconductive surface is positioned to engage with a set of developer assemblies.

12. The print apparatus of claim 10, wherein the print blanket is on a belt, and wherein the print blanket is positioned to engage a plurality of photoconductive surfaces, with each of the photoconductive surfaces positioned to engage with a respective set of developer assemblies.

13. A method for servicing a print blanket utilizing a thermoplastic print agent, comprising:

causing transfer of a portion of the thermoplastic print agent from the print blanket to an endless cleaning surface (ESC) that is rotatable;

scraping a portion of the thermoplastic print agent from the ECS with a doctor blade connected to the ECS to cause the portion of the thermoplastic print agent to move into a container;

heating the container such that the portion of the thermoplastic print agent scraped into the container does not solidify;

causing thermoplastic print agent heated in the container to be picked up by the ECS.

14. The method of claim 13 comprising a containment blade connected to the ECS to contain a portion of the thermoplastic print agent in the container.

15. The method of claim 13, comprising, determining, by a sensor, when the container holds more than a predetermined quantity of thermoplastic print agent, and sending an instruction to empty a removable collection element.

* * * * *